United States Patent
Henning et al.

[11] 3,932,022
[45] Jan. 13, 1976

[54] LIGHT GUIDE ARRANGEMENT WITH SCANNING TIP TO RESIST UNEVEN WEAR

[75] Inventors: Wolfram Henning; Michael Gettwart, both of Allersberg, Germany

[73] Assignee: The Rank Organisation Limited, London, England

[22] Filed: Nov. 19, 1973

[21] Appl. No.: 417,283

[30] Foreign Application Priority Data
Nov. 17, 1972 Germany.............................. 2256425

[52] U.S. Cl.................................. 350/96 R; 250/227
[51] Int. Cl.²............................................. G02B 5/14
[58] Field of Search.......... 350/96 R, 96 B; 250/227

[56] References Cited
UNITED STATES PATENTS

| | | | |
|---|---|---|---|
| 3,350,654 | 10/1967 | Snitzer................................. | 250/227 |
| 3,509,353 | 4/1970 | Sundblad et al................... | 350/96 R |
| 3,781,555 | 12/1973 | Keefe.................................. | 250/227 |

*Primary Examiner*—Eli Lieberman
*Attorney, Agent, or Firm*—Brisebois & Kruger

[57] ABSTRACT

A light guide arrangement in which at least two light guides are coupled at one end to an optical integration Chamber for achieving a common field of view from the remote ends of both or all of the light guides even when the end of the optical integration chamber is in contact with a surface being scanned, in which the components of the optical integration chamber, that is a light guiding element, a sheath of optically insulating material, and an outer cladding are held together by a bond which does not involve the use of a bonding material, to attenuate the problems due to wear of the scanning end of the optical integration chamber. The scanning tip of the integration chamber may be drawn to a point during or after the bonding to form a well defined scanning point.

12 Claims, 5 Drawing Figures

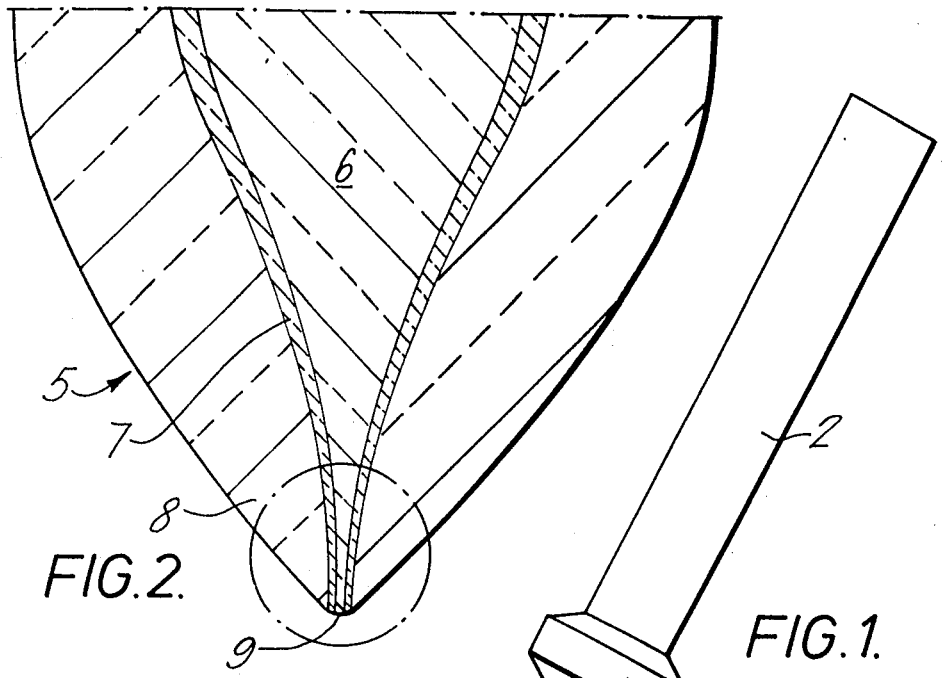
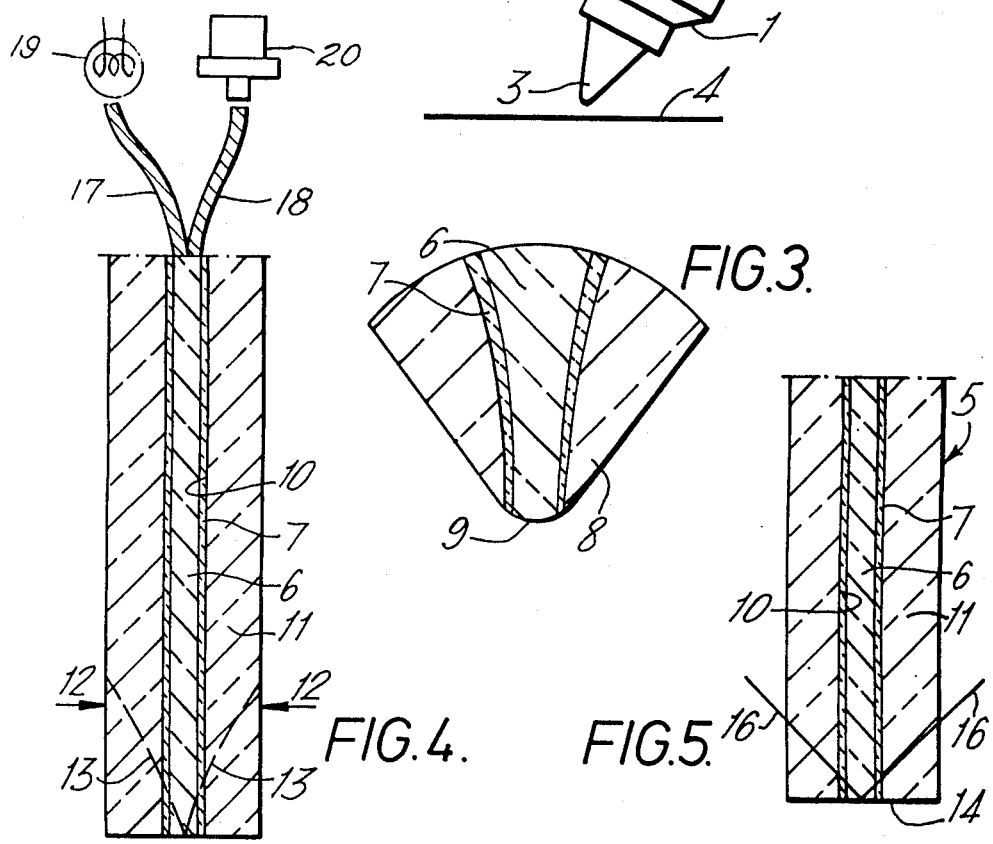

LIGHT GUIDE ARRANGEMENT WITH SCANNING TIP TO RESIST UNEVEN WEAR

The invention relates to a light guide arrangement, and particularly to an optical fibre light guide arrangement having at least two separate light guides and a light guiding element associated with the light guides at one end thereof for achieving a common field of view from the other ends of the light guides. This is achieved by arranging the end faces of the one ends of the light guides to be coplanar and abutting an optical integrator serving to compound the beam paths of light from the individual light guides. An arrangement of this type is described and claimed in British patent application No. 6033/73.

The invention to which British patent application No. 6033/73 relates is defined in claim 1 of the specification to be a light guide arrangement having at least two light guides with one end of one light guide adjacent one end of the other light guide so that the field of view from the other ends of the light guides is substantially the same, in which there is provided a light integrating element adjoining and substantially covering the said one ends of the light guides, the dimensions of the integrating element being such that it effects intermixing of the beam paths from the two light guides.

A light guide arrangement of this type is particularly suitable for use in circumstances where there is a light source at the said other end of one of the light guides and a light sensor at the said other end of the other of the light guides, the optical integrator being used as a scanning head. Provided the optical integrator is sufficiently long there is a light path between the one ends of the light guides even when the scanning head lies directly upon the scanned surface for so-called "contact scanning." This type of scanning of information carriers gives rise to its own problems because the contacting face of the optical integrator of the scanning head is subjected to a considerable amount of wear, which curtails the useful life of the scanning head to an unacceptable extent, particularly in view of the fact that useful lives for the scanning head of the order of several million scanning operations are required.

A further difficulty, in connection with abrasion of the scanning head, lies in the fact that the different materials of the various adjacent parts of the scanning head subjected to abrasion will wear away at different rates. For example, if the light guiding element of the optical integrator is a monofilament glass fibre having a cladding made of metal, such as steel adhesively secured thereto, then a crater is formed around the glass fibre as a result of the effect of the unequal wear of these different materials. Moreover, at this position there is an accumulation of dust, which originates primarily from the abrasion of the information carrier being scanned, and this results in spurious signals. In addition the bonding medium, for example an adhesive or the like, by means of which the parts of the scanning head subject to abrasion are secured together is also subject to abrasion and this leads to further difficulties due to the formation of dust and unequal wear, leading to damage to the scanning head and unreliability of operation due to spurious signals.

This problem assumes a particular importance if the scanning is effected manually in consequence of which the scanning head is usually held in an inclined position which is frequently changing. For these reasons the scanning head represents by far the weakest component of a device for recording, storing, and/or evaluating, information from an information carrier.

According to the present invention there is provided a light guide arrangement having at least two light guides with one end of one light guide adjacent one end of the other light guide so that the field of view from the other ends of the light guides is substantially the same, and a light guiding element adjacent the said one ends of the light guides, in which the light guiding element forms part of an optical integrator operable to effect intermixing of the beam paths from the two light guides, the components of the optical integrator being secured together by a self-retaining bond.

When used in this specification the term "self-retaining bond" will be understood to relate to a bond made between two materials without the use of a separate bonding material; the term "light" will be understood to relate to electromagnetic radiation both within and outside the visible spectrum; and the term "optical fibre" will be understood to relate to a light guide capable of transmitting light from one end to the other by successive internal reflections with substantially no attenuation from end to end.

The use of a self-retaining bond and the omission of a bonding medium between the components of the light guiding element of the optical integrator eliminates the possibility of unequal wear phenomena between the bonding medium and the components of the scanning end of the optical integrator which occurs in conventional scanning heads when used for contact scanning. Apart from this, the individual parts of the optical integrator can be united in a particularly intimate manner when the bonding between the materials thereof is self-retaining. The optical integrator conveniently comprises three parts, a central light guiding element, which may be a large diameter monofilament optical fibre, a light insulating sheath surrounding the light guide, and an outer cladding surrounding the sheath.

In a preferred embodiment of the invention the connection between the parts of the integration chamber, that is the light guiding element, the optical insulator and the other cladding is effected by means of a fused or sintered joint. In this way the various parts of the system are held together by a surface union, which makes the use of an additional bonding medium superfluous.

The present invention also comprehends a method of manufacturing an optical integrator for a light guiding arrangement, comprising the steps of forming a light guiding element of optically transparent material to a selected shape, surrounding the light guiding element with a sheath of optically insulating material, surrounding the sheath of optically insulating material with an outer cladding, and forming a self-retaining bond at the interfaces between the light guiding element and the light insulator, and between the light insulator and the outer cladding.

This method according to the invention also permits the formation of a scanning head having a pointed shape simultaneously with the formation of the bond between the parts by fusion or sintering if a suitable technique is adopted.

By arranging the components of the optical integrator in the bore of a tube and effecting suitable heating of this tube to bring the components to a softened condition, it is possible to draw out the light guiding element, the optical insulator surrounding it, and the cladding, to form an apex with a slight rounding off of the light guiding element which projects at the apex since it is the central component. This is particularly of advantage if the scanning head is to be employed for manual scanning in which it is likely to be held at an inclined position, whose angle of inclination is of the order of about 50°.

Preferably, the component parts of the optical integrator, that is the light guiding element, any optical insulator provided therewith, and the surrounding cladding, are made of materials having substantially the same resistance to abrasion. In such a case, even after very long use, a satisfactory scanning surface remains available at the end of the scanning head and this is not impaired even in the presence of deposited dust because the scanning apex substantially retains its original shape.

It is also advantageous if the light guiding element, the optical insulator and the cladding of the optical integrator consist of materials having substantially the same working properties, that is the properties of softening temperature or melting temperature, thermal expansion and the like, such that neither during the manufacture of the optical integrator nor when using the apparatus, are undesirable forces, stresses, or the like set up which could result in a premature and unequal wear of the components.

Suitable materials for the manufacture of the light guiding element of the optical integrator include glass, synthetic material such as polystyrol, quartz, sapphire or the like, and for the manufacture of the cladding of the optical integrator glass, preferably black glass, synthetic material such as acrylic glass, glass enamel, quartz or the like would be suitable. For satisfactory bonding of the light guide to the optical insulator, and the optical insulator to the cladding, suitable combinations of materials include polystyrol/acrylic glass, sapphire/glass enamel, glass/quartz, quartz/glass, glass/glass.

One embodiment of the invention will now be more particularly described, by way of example, with reference to the accompanying drawings, in which:

FIG. 1 is a schematic representation of the outer appearance of a hand held optical fibre light guide device formed as an embodiment of the invention;

FIG. 2. is an axial section on an enlarged scale of the scanning point of the optical integrator of the device shown in FIG. 1;

FIG. 3 is an enlargement of a detail of FIG. 2;

FIG. 4 is a simplified representation of part of the embodiment of FIGS. 1 to 3 during manufacture; and FIG. 5 is a representation similar to FIG. 4 illustrating an alternative method for forming the scanning point.

Referring now to the drawings there is shown in FIG. 1 a device 2 for scanning information carriers, which can have any convenient capacity for storing information. The device 2 includes a scanning head 1 having an optical arrangement as shown in FIG. 4 comprising at least two light guides 17, 18 each having one end adjacent the corresponding end of the other light guide and facing a light guiding element 6 of an optical integrator. At the remote end of one of the light guides 17 there is a light source 19 and at the remote end of the other light guide 18 there is an optical detector 20 the output from which is fed as data signals to a circuit accommodated in the shaft 2, FIG. 1, which may form part of or be connected to a computer serving to effect the storage and processing of the desired data. The optical integrator is formed with an apex 3 which, upon scanning is passed over an information carrier 4, which may be, for example, a card bearing a specification of goods. By the use of a very fine degree of resolution, which may be, for example, up to $150\mu$, it is possible to accommodate an exceedingly large amount of data in a small space and to transmit it.

The apex 3 of the optical integrator of the scanning head 1 includes a light guiding element 6, preferably of circular cross section, which is surrounded by an optical insulator 7, which is likewise of glass. At the interface between the light guiding element 6 and the insulator 7 there takes place a total reflection of the rays received by the light guiding element 6. Surrounding the optical insulator 7 there is a cladding 8, which consists, for example, of black glass, which has a high impermeability to light and which serves as a screen. These three components converge up to the scanning point 9 in such a manner that they retain their respective functions up to the said scanning point 9.

The light guiding element 6, the optical insulator 7 and the cladding 8 are sintered together or fused together at their respective interfaces. This operation can be effected by arranging the light guiding element 6 sheathed in the optical insulator 7 in the bore 10 of a tube 11 of black glass; the tube 11 is then heated in the region 12 shown in FIG. 4 up to a suitable softening temperature of the materials. In this way a certain quantity of the material can be caused to flow downwardly in drop form at the lower point of this system, so that the components maintain their concentric relationship whilst the end of the device is drawn out to a pointed shape somewhat in the manner indicated by the dashed lines 13 of FIG. 4. At the same time the various components fuse together at their surfaces of contact so that a union is created to achieve self-retention of the components of the optical integrator. If desired, the scanning point 9 can be subjected to mechanical working so that it assumes the desired curved shape shown in detail in FIG. 3.

Alternatively the end 14 of the optical integrator 5 may be sintered or fused in such a way that the components substantially retain their initial shape and subsequently a point is ground at the end 14 of the device 5 as indicated by the inclined lines 16.

We claim:

1. In a light guide arrangement of the type having:
   at least two light guides having first and second ends respectively, and
   an optical integrator having an input end adjacent said first ends of said at least two light guides and a tapered scanning end, and being operative to intermix light paths of light from said first ends of said at least two light guides to provide substantially the same field of view from said second end of each of said at least two light guides even when said scanning end of said optical integrator is in contact with a surface being scanned,
   the improvement wherein:
   said optical integrator includes a light guiding element,
   and a cladding of light impermeable nonmetallic material surrounding said light guiding element and extending from said input end to said tapered scanning end of said integrator said cladding being bonded to said light guiding element without the use of a bonding material whereby to avoid differential wear between the bonding material and said components of said optical integrator at said scanning end thereof.

2. The light guide arrangement of claim 1 wherein said optical integrator comprises said light guiding element,
an optical insulator surrounding said light guiding element, and
said outer cladding element surrounding said optical insulator.

3. The light guide arrangement of claim 2 wherein said components of said optical integrator are bonded together by one of fusion and sintering.

4. The light guide arrangement of claim 2 wherein said light guiding element, said optical insulator, and said outer cladding element of said optical integrator are made of materials having substantially the same resistance to abrasion.

5. The light guide arrangement of claim 1 wherein said light guiding element is made of glass.

6. The light guide arrangement of claim 2 wherein said outer cladding element is made of black glass.

7. The light guide arrangement of claim 1 wherein said light guide is made of polystyrene.

8. The light guide arrangement of claim 1 wherein said light guide is made of quartz.

9. The light guide arrangement of claim 1 wherein said light guide is made of sapphire.

10. The light guide arrangement of claim 2 wherein said outer cladding element is made of acrylic glass.

11. The light guide arrangement of claim 2 wherein said outer cladding element is made of enamel.

12. The light guide arrangement of claim 2 wherein said outer cladding element is made of quartz.

* * * * *